(12) United States Patent
Jennings

(10) Patent No.: US 6,227,222 B1
(45) Date of Patent: May 8, 2001

(54) CLOSED OIL LIQUID RING GAS COMPRESSION SYSTEM WITH A SUCTION INJECTION PORT

(75) Inventor: Gary Jennings, Pampa, TX (US)

(73) Assignee: Fluid Compressor Corp., Pampa, TX (US)

( * ) Notice: Subject to any disclaimer, the term of this patent is extended or adjusted under 35 U.S.C. 154(b) by 0 days.

(21) Appl. No.: 09/477,934

(22) Filed: Jan. 5, 2000

(51) Int. Cl.[7] .................................................. G05D 7/00
(52) U.S. Cl. ........................ 137/14; 137/171; 137/565.01
(58) Field of Search .................... 137/14, 171, 565.01

(56) References Cited

U.S. PATENT DOCUMENTS

| | | | |
|---|---|---|---|
| 3,416,547 | * 12/1968 | Glenn et al. | 137/171 X |
| 3,707,157 | * 12/1972 | Tipton et al. | 137/171 X |
| 5,375,618 | * 12/1994 | Giannesini | 137/171 X |
| 5,421,357 | * 6/1995 | Levallois | 137/8 X |
| 5,544,672 | * 8/1996 | Payne et al. | 137/171 |
| 5,706,850 | * 1/1998 | Nares | 137/171 |

* cited by examiner

*Primary Examiner*—Gerald A. Michalsky
(74) *Attorney, Agent, or Firm*—James E. Bradley; Bracewell & Patterson, L.L.P.

(57) ABSTRACT

A gas compressor system draws and compresses gas from a well, wherein the gas has entrained liquid and vapor. The apparatus has a scrubber vessel for receiving the gas and separating at least a portion of the liquid. A storage vessel integral with the scrubber stores seal liquid. The seal liquid is injected into the gas before a single stage liquid ring pump which uses the seal liquid to compress the gas. The compressed gas along with entrained seal liquid is routed to a separator vessel having a coalescing filter. The entrained seal liquid is separated from the gas and routed back to the storage vessel.

22 Claims, 2 Drawing Sheets

CLOSED OIL LIQUID RING GAS COMPRESSION SYSTEM WITH A SUCTION INJECTION PORT

TECHNICAL FIELD

This invention relates to gas compression systems, and more particularly to a closed oil gas compression system utilizing a liquid ring pump.

BACKGROUND OF THE INVENTION

Many of the existing hydrocarbon formations have been produced to such a point that the natural gas available in these reserves is at low pressures or below atmospheric pressure. To produce natural gas from these reserves, the gas must be pumped from the formation and compressed for sale. The cost to pump and compress gas can be substantial; therefore, cost saving measures are important in making retrieval of the gas economically viable.

Generally a self contained compression system is used to extract natural gas from low or below pressure reserves, and is located on the well site. The compression system comprises a variety of apparatus, including a compressor. Typically, prior art compression systems employ a screw type compressor to draw gas from the formation and compress it for sale. However, screw compressors are expensive and require relatively high energy inputs to compress the gas. Further, these compressors have parts with metal-to-metal contact which require a constant oil source. The oil is deposited into the pump and eventually is carried away by the compressed gas, thus the screw pumps use oil and the oil source must regularly be replenished. Other compressor types commonly used in these applications also require a constant oil feed.

The gas extracted from some low or below pressure formations contain vapors and entrained liquid. Typical compression systems used with these wells must dry the gas before it can be compressed, because screw and other typical compressors cannot handle the liquid. In these systems, when the compressor encounters liquid or vapor the compressor will overload and shut down.

Therefore, there exists a need for a compression system which can handle gas having vapors and entrained liquid. Also, a closed oil system is desirable because the oil reserves need not be refilled as often. Finally, the compressor system should compress efficiently and at low cost.

SUMMARY OF THE INVENTION

The present invention is drawn to a closed oil compression system employing a liquid ring pump. The invention is an apparatus for compressing a gas from a well. The gas has entrained liquid and vapor. The apparatus has a scrubber vessel for receiving the gas and separating at least a portion of the liquid and vapor. A storage vessel stores a seal liquid. A liquid ring pump is connected to the scrubber vessel and storage vessel. Seal liquid is mixed with the gas before it enters the pump, and the liquid is used to compress the gas. A separator vessel is connected to the pump and the storage vessel for separating at least a portion of any seal liquid entrained in the gas and returning the separated seal liquid to the storage vessel.

The storage vessel is integral with the scrubber vessel. The scrubber has an internal partition which divides the scrubber vessel into a first and second chamber, wherein the second chamber is the storage vessel. The separator vessel has a coalescing filter that further separates seal liquid from the gas. The separator vessel has a cylindrical splash guard surrounding the coalescing filter. A scavenger line runs from the coalescing filter to a conduit between the scrubber and the pump. The liquid ring pump is single stage having a single inlet and single outlet. Further the apparatus has a heat exchanger and temperature responsive valve. The temperature responsive valve routes seal liquid from the storage vessel through the heat exchanger before mixing with the gas if the temperature of the seal liquid is above a given temperature.

Further, the present invention encompasses a method of compressing wet gas from a well, the wet gas having entrained liquid and vapor. The method includes the steps of providing a suction scrubber, a storage vessel containing seal liquid, a liquid ring pump, and a discharge separator. At least a portion of the liquid and vapor are separated from the gas with the suction scrubber. The seal liquid is injected into the gas before it enters the liquid ring pump. The gas is compressed with the seal liquid in the liquid ring pump. At least a portion of any seal liquid from the gas is separated in the discharge separator and the separated liquid is fed back into the storage vessel.

Further steps include cooling the seal liquid before injection into the gas. A coalescing filter with a splash guard is provided in the discharge separator and the coalescing filter separates at least a portion of any seal liquid from the gas. A partition is provided in the suction scrubber to form the storage vessel.

DISCLOSURE OF THE INVENTION

Figure 1:
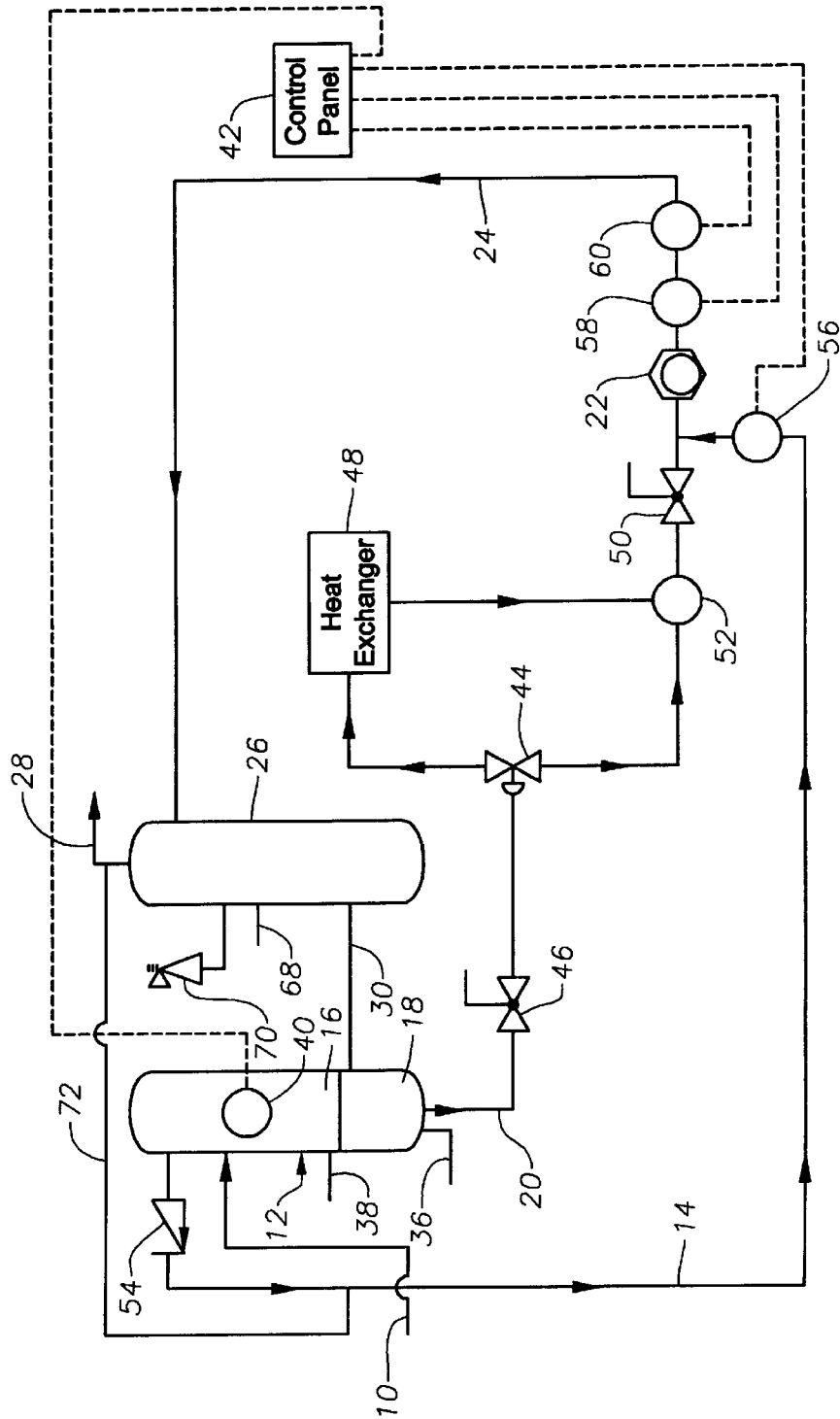
FIG. 1 is a schematic of the gas compression system of this invention.

Referring to FIG. 1, the system of this invention described in general terms accepts a feed stream 10 from a well, generally referred to as wet gas because it contains a vapor constituent and sometimes a small liquid constituent entrained in the gas. Feed stream 10 is supplied at a relatively low pressure and is drawn into suction scrubber 12 which removes by gravity heavier vapor and liquid portions and enables the gaseous and lighter vapors to be drawn out of scrubber 12 through suction line 14. The separated liquid falls to the bottom and is stored in a primary chamber 16 of scrubber 12.

Scrubber 12 has a secondary chamber 18 separated from primary chamber 16 in which seal liquid, preferably a conventional SAE 10W or higher viscosity grade hydraulic oil, is stored. Seal liquid is removed from secondary chamber 18 through seal liquid line 20 and routed to a single stage liquid ring pump 22 as needed. En route to pump 22, seal liquid is combined in metered portions with the gas and lighter vapors from suction line 14. Liquid ring pump 22 uses the seal liquid to compress the gas from line 14 and draws a vacuum on line 14 and chamber 16. A mixture of compressed gas, vapor, and any seal liquid and condensed liquid entrained in the gas is then routed through discharge line 24 to discharge separator 26. Separator 26 removes any liquids, including entrained seal liquid, and the compressed gaseous product, including hydrocarbon vapor, discharges through discharge outlet 28. Discharge outlet 28 leads to a natural gas pipeline for further processing. The separated liquid portion, which is predominantly seal liquid, falls to the bottom of separator 26 and is routed back to secondary chamber 18 through seal liquid fill line 30 as needed. The entire system, including scrubber 12, pump 22, separator 26, and all piping, sensors, and valves are held on a single skid 32 (FIGS. 2 and 3).

Figure 2:
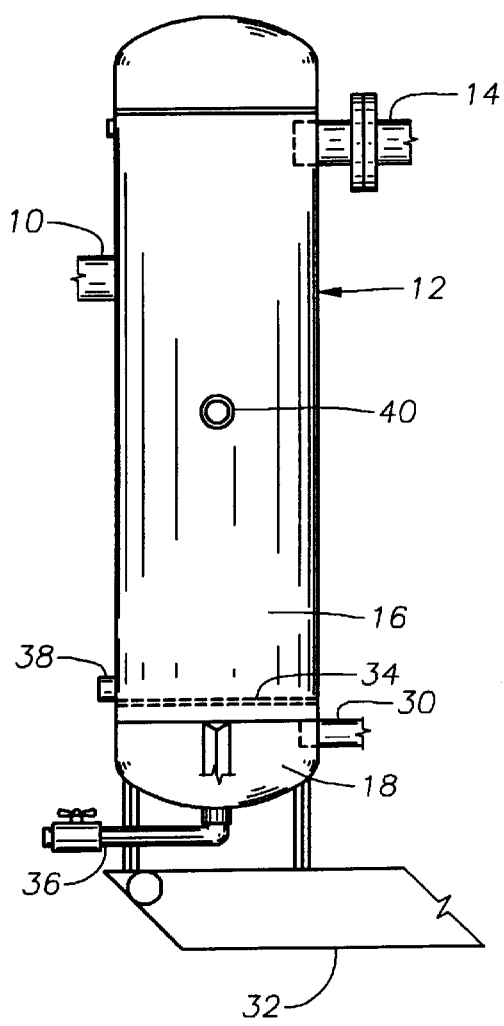
FIG. 2 is an elevation view of the suction scrubber of the system of FIG. 1.
Figure 3:
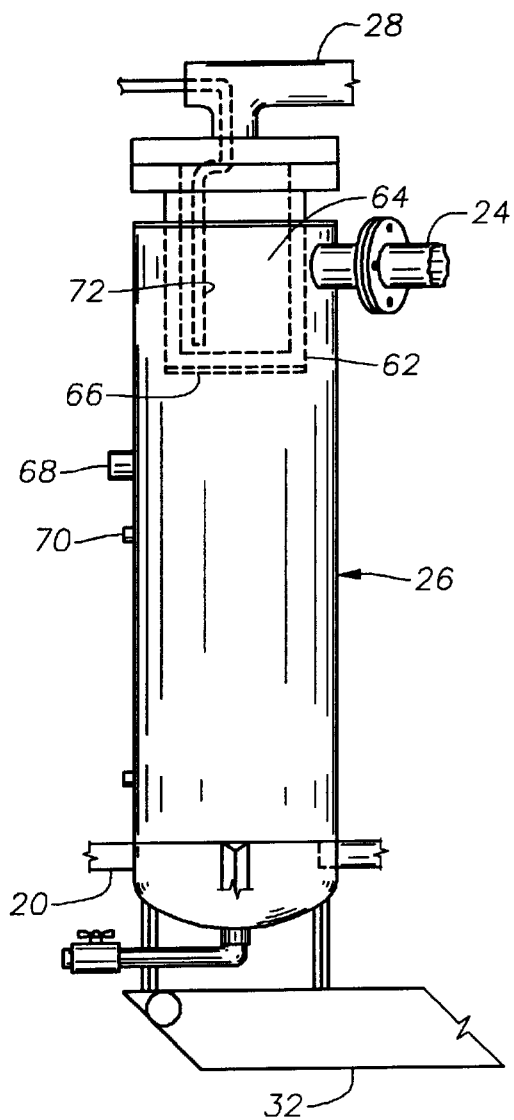
FIG. 3 is an elevation view of the discharge separator of the system of FIG. 1.

More specifically, scrubber 12, as shown in FIG. 2, is a generally cylindrical pressure vessel with a partition 34 separating the primary chamber 16 above and secondary chamber 18 below. Wet gas from feed stream 10 is drawn into the interior of primary chamber 16 near an upper end. The heavier vapors disperse and liquid portions fall to the bottom of primary chamber 16, while the gaseous and lighter vapor portions are sucked upward through suction line 14. Suction line 14 intersects primary chamber 16 above feed stream 10. Eventually, the dispersed heavier vapor condenses and falls to the bottom and combines with the separated liquid portion. A seal liquid drain line 36 is positioned in the lowest point of scrubber 12 in secondary chamber 18, and a scrubber drain line 38 is positioned above and adjacent to partition 34 in primary chamber 16. The separated liquid collects in and fills the bottom of primary chamber 16 and scrubber drain line 38 allows the liquid to be periodically removed. Seal liquid is stored in secondary chamber 18, and seal liquid drain line 36 allows the seal liquid to be periodically removed. A liquid level controller 40 is mounted in a side of scrubber 12 to sense the liquid level in primary chamber 16 and report to a central control panel 42 (FIG. 1). Liquid level controller 40 is set to shut off pump 22 when the liquid level reaches a predetermined height and indicates a liquid level shut down on panel 42.

Referring again to FIG. 1, seal liquid exits secondary chamber 18 through seal liquid line 20 and is routed to a temperature responsive valve 44. An intermediate valve 46 is positioned between temperature responsive valve 44 and scrubber 12 to allow the flow in line 16 to be restricted or entirely shut off. Temperature responsive valve 44 is a thermostatic coil valve responsive to temperature to route liquid through a heat exchanger 48 and to a metering valve 50 if its temperature is above a given value, preferably 160° Fahrenheit, or straight to the metering valve 48 if its temperature is below that given value. Heat exchanger 48 is sized to cool the liquid to the given value, in this case 160° Fahrenheit. A temperature sensor 52 is positioned at the entrance of valve 50 to sense the temperature of entering liquid and report to control panel 42.

Suction line 14 has a check valve 54 to prevent back-flow of gas and vapor into primary chamber 16 of scrubber 12. A suction shutdown sensor 56 is positioned in suction line 14 to shut pump 22 off when the vacuum in line 14 reaches a predetermined point and indicates a suction shutdown on panel 42. Line 14 converges with seal liquid line 20 after metering valve 50 and before liquid ring pump 22. Metering valve 50 meters the amount of seal liquid introduced into the gas in suction line 14.

Liquid ring pump 22 is a conventional single-stage liquid ring pump which uses the seal liquid to compress the gas and light vapor stream from suction line 14. It has a single inlet, suction line 14, and a single outlet, discharge line 24; wherein a two-stage liquid ring pump would have separate inlets and outlets for the gas and the seal liquid. Liquid ring pumps are unique in that they can compress gas with significant amounts of vapor to high pressures without damage to the pump. Pump 22 creates a vacuum in suction line 14, thus drawing gas into suction scrubber 12 and through suction line 14. The gas and seal liquid mixture entering pump 22 is separated and compressed, then routed through discharge line 24 to separator 26. Discharge line 24 has a temperature shutdown sensor 58 which reports to central control panel 42 and can shut pump 22 down if the temperature of the gas and liquid mixture is over a predetermined temperature. A discharge shutdown sensor 60 is positioned in discharge line 24 to shut down pump 22 if the pressure in line 24 is above a predetermined pressure.

Referring to FIG. 3, discharge separator 26 is similar to scrubber 12 in that it is a generally cylindrical pressure vessel, and the compressed mixture is drawn in near an upper end. As the compressed mixture from line 24 enters separator 26 the heavier liquids fall to the bottom. A cylindrical baffle or splash guard 62 joined to the top of separator 26 and extending downward in front of the entrance of line 24 contains a cup-shaped coalescing filter 64. The cylindrical sidewalls of splash guard 62 are impermeable and spaced inward from the sidewalls of separator 26. This creates an annular space between the sidewalls of splash guard 62 and separator 26. The discharge of line 24 strikes the sidewall of splash guard 62. The sidewall of coalescing filter 64 is smaller in outer diameter than the diameter of splash guard 62 creating an annular space. The bottom of splash guard 62 has a cover 66 with holes that allow gas and light vapor to be drawn into the coalescing filter 64. Most of the entrained liquid coalesces on filter 64 and falls to the bottom of separator 26 as liquid, while the final gaseous portion which has now been compressed is removed through discharge outlet 28. Note that liquid vapor and lighter hydrocarbons produced from the well along with the gas is not significantly separated by separator 26 and remains in the discharge gas. The liquid separated by separator 26 is primarily seal liquid.

A scavenger line 72 runs from the bottom of coalescing filter 64 out of discharge separator and into suction line 14 downstream of check valve 54 (FIG. 1). Scavenger line 72 creates a lower pressure within coalescing filter 64 to increase flow through the filter 64, and thus increase the amount of seal liquid captured. Separator 26 has a fill line 68 through which seal liquid can be added to the system, and a pressure relief valve 70.

The apparatus of this invention has several significant advantages over the prior art. The system is a closed oil system; therefore does not require a continuous oil feed. The guard in the discharge separator boosts its separating efficiency and increases the life of the coalescing filter. Therefore, more of the seal liquid is recovered and the product discharged through the discharge outlet is dryer. The two chambered suction scrubber allows seal liquid to be stored in the bottom of the scrubber without the need for a separate storage vessel. Seal liquid is also stored in the discharge separator. The use of a hydraulic oil as seal fluid as opposed to water and glycol allows a majority of the seal fluid to be recovered in the discharge separator. The use of a single stage liquid ring compressor, wherein the gas and seal liquid are combined before the compressor, allows the system to operate at a much greater flow rate and compress to a greater pressure. Because of the liquid ring compressor, the system can handle much higher liquid content in the feed stream. Also the liquid ring compressor costs less and requires a lesser energy input to operate at the same or higher compression as other systems.

While the invention has been shown in only one of its forms, it should be apparent to those skilled in the art that it is not so limited but is susceptible to various changes and modifications without departing from the spirit thereof.

We claim:

1. An apparatus for compressing a gas from a well, the gas having entrained hydrocarbon liquid, the apparatus comprising:
   a scrubber vessel for receiving gas from a well and gravity separating at least a portion of any entrained hydrocarbon liquid from the gas;
   a liquid ring pump having an inlet connected to the scrubber vessel for creating a negative pressure in the scrubber vessel to draw gas from the well and for compressing the gas to a desired pressure;
   a seal liquid line connected to the inlet of the pump for delivering a seal liquid to the inlet of the pump for mixing with the gas prior to being compressed; and
   a separator vessel connected to an outlet of the pump for separating the seal liquid entrained in the gas, returning the separated seal liquid to the seal liquid line, and for discharging the compressed gas to a gas outlet line.

2. The apparatus of claim 1 wherein:
   the scrubber vessel has a first and second separate chambers, wherein the first chamber receives the gas from the well; and
   the seal liquid line has a first portion extending from the separator vessel to the second chamber and a second portion extending from the second chamber to the inlet of the pump, to store the seal liquid in the second chamber.

3. The apparatus of claim 2 wherein the scrubber vessel has an internal partition which divides the scrubber vessel into the first and second chambers.

4. The apparatus of claim 1 wherein the separator vessel has a coalescing filter that further separates the seal liquid from the gas.

5. The apparatus of claim 4 wherein the separator vessel further comprises a splash guard adjacent the coalescing filter, the splash guard having a wall positioned adjacent an inlet leading from the outlet of the pump for blocking the filter from contact with a stream of the gas and entrained seal liquid flowing from the pump.

6. The apparatus of claim 5 wherein the splash guard is cylindrical and spaced inward from the inlet.

7. The apparatus of claim 4 wherein the separator vessel has a scavenger line running from the coalescing filter to a conduit between the scrubber vessel and the pump, for lowering pressure in the separator vessel to increase a flow rate of the gas through the separator vessel.

8. The apparatus of claim 1 wherein the liquid ring pump is single stage having a single inlet and single outlet.

9. The apparatus of claim 1 wherein the seal liquid is a hydraulic oil.

10. The apparatus of claim 9 wherein the seal liquid is an oil with an SAE 10W or higher viscosity grade.

11. The apparatus of claim 1 further comprising a heat exchanger and temperature responsive valve in the seal liquid line, wherein the temperature responsive valve routes the seal liquid from the separator through the heat exchanger for cooling before mixing with the gas if the temperature of the seal liquid is above a given temperature.

12. A device for producing gas from a well, the gas having entrained liquid and vapor, the device comprising:
   a scrubber vessel having a housing containing a primary chamber separated from a secondary chamber, wherein the primary chamber is adapted to receive gas and entrained liquid from a well to separate by gravity at least some of the liquid from the gas, and the secondary chamber is adapted to store a seal liquid;
   a liquid ring pump having an inlet connected to the primary and secondary chambers of the scrubber vessel for using the seal liquid to compress the gas, wherein the seal liquid and the gas are mixed before entering the pump;
   a separator vessel connected to an outlet of the pump for separating any seal liquid from the gas and discharging the gas to an outlet line; and
   a seal liquid line leading from the separator vessel to the secondary chamber for returning the separated seal liquid.

13. The device of claim 12 wherein the separator vessel has a coalescing filter that further separates the seal liquid from the gas.

14. The device of claim 13 wherein the separator vessel further comprises a splash guard adjacent the coalescing filter, the splash guard having a wall positioned adjacent an inlet leading from the outlet of the pump for blocking the filter from contact with a stream of the gas and entrained seal liquid flowing from the pump.

15. The device of claim 14 wherein the splash guard is cylindrical and spaced inward from the inlet.

16. The device of claim 13 further comprising a scavenger line running from the coalescing filter to a conduit between the scrubber and the pump, for lowering pressure in the separator vessel to increase a flow rate of the gas.

17. The device of claim 12 wherein the primary chamber has an outlet leading to the pump that is located above an inlet adapted to receive the gas from the well.

18. The device of claim 12 wherein the liquid ring pump is single stage having a single inlet and single outlet.

19. The device of claim 12 wherein the seal fluid is a hydraulic oil.

20. A method of compressing wet gas from a well, the wet gas have entrained liquid, comprising the steps of:
   with a liquid ring pump, creating a suction at an inlet of the pump to draw the gas from the well into a suction scrubber, creating a gas stream flowing through the scrubber to the pump;
   injecting a seal liquid into the gas stream before it enters the liquid ring pump;
   compressing the gas with the seal liquid in the liquid ring pump; and
   separating at least a portion of any seal liquid from the gas in a discharge separator and feeding the separated seal liquid back into the gas stream before it enters the liquid ring pump.

21. The method of claim 20 further comprising the step of cooling the seal liquid after leaving the discharge separator and before injection into the gas stream.

22. The method of claim 20 further comprising the steps of:
   providing a partition in the suction scrubber to form a primary chamber for receiving the gas from the well and a secondary chamber; and
   delivering seal liquid from the separator to the secondary chamber and delivering seal liquid from the secondary chamber to the gas stream flowing into the inlet of the pump.

* * * * *